UNITED STATES PATENT OFFICE.

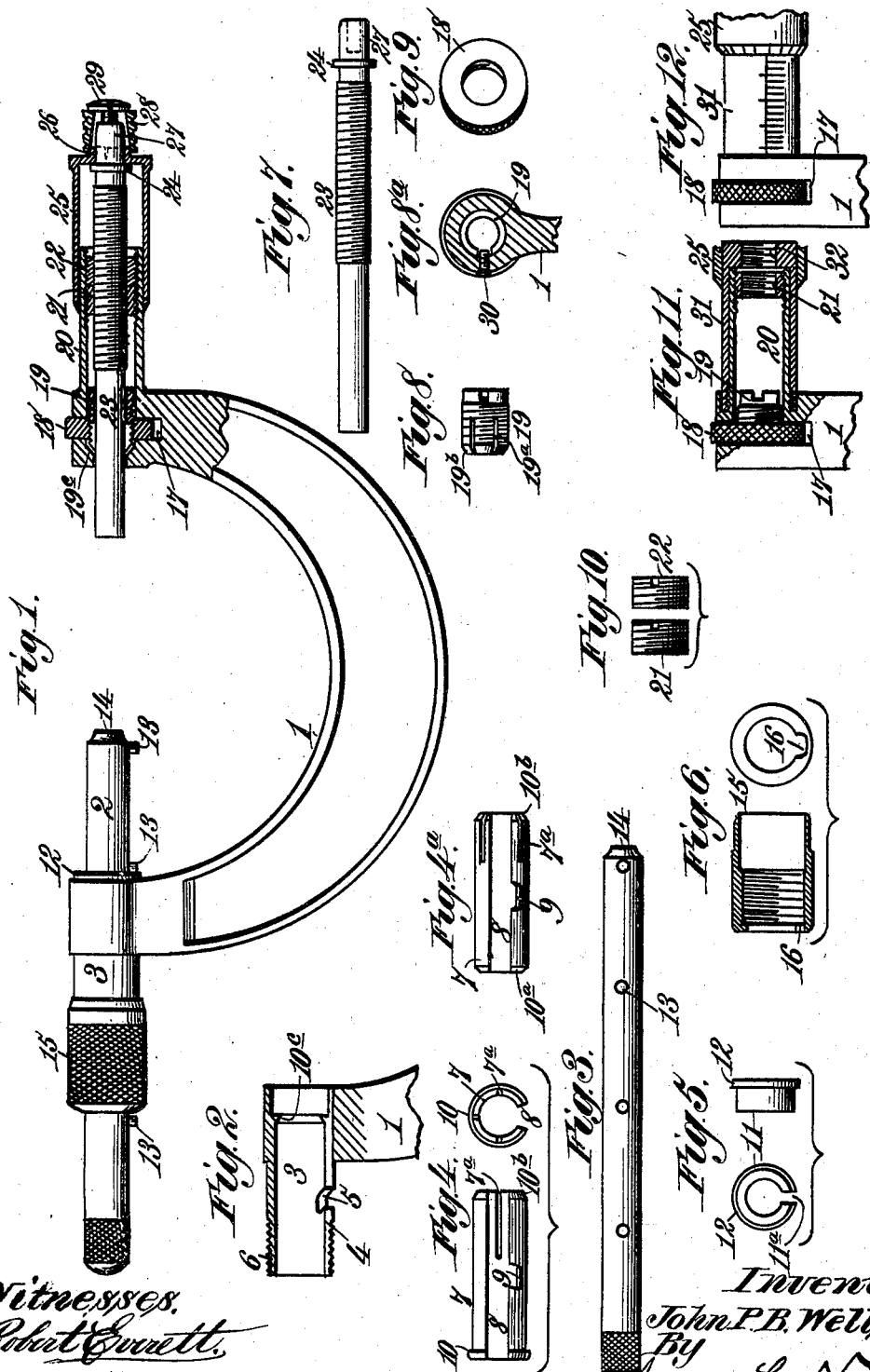

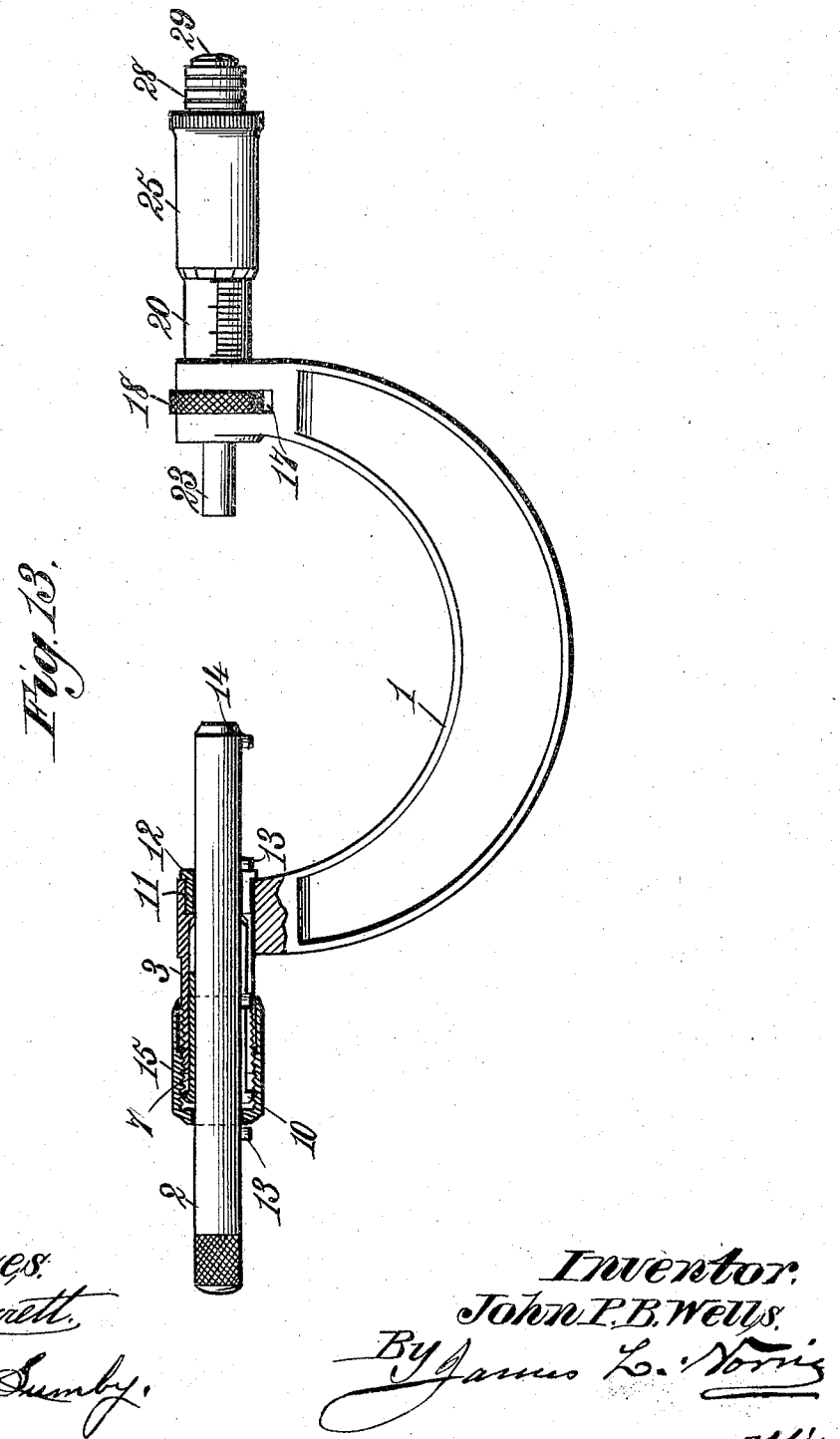

JOHN P. B. WELLS, OF ATHOL, MASSACHUSETTS.

MICROMETER-CALIPERS.

SPECIFICATION forming part of Letters Patent No. 641,173, dated January 9, 1900.

Application filed March 24, 1899. Serial No. 710,346. (No model.)

*To all whom it may concern:*

Be it known that I, JOHN P. B. WELLS, a citizen of the United States, residing at Athol, in the county of Worcester and State of Massachusetts, have invented new and useful Improvements in Micrometer-Calipers, of which the following is a specification.

This invention relates to micrometer-calipers of that general character in which an anvil is supported in one arm of a suitable frame and the measuring screw or spindle, with its micrometric adjusting mechanism, is arranged to maintain a true axial position in an opposite arm of said frame, so that the plane of the spindle end and the plane of the opposed anvil shall be at all times precisely parallel.

It is among the objects of my improvements to provide a measuring instrument capable of quick, easy, and accurate adjustment both for the anvil and measuring-screw, to provide simple and improved locking mechanism for the anvil at any point to which it may be adjusted, to provide improved and secure locking devices for the micrometer mechanism, to provide improved means for clamping together the micrometer-sleeve and measuring-screw; also, to provide an improved construction and arrangement of devices that shall compensate for wear without impairing the capacity of the instrument for a wide range of precise measurement, and generally to provide for a simple, durable, and efficient construction in the several parts of the instrument.

In the annexed drawings, illustrating the invention, Figure 1 is an elevation of one form of my improved micrometer-calipers in part central longitudinal section. Fig. 2 is a part-sectional view of the anvil end of the instrument with the anvil-rod and its locking mechanism removed. Fig. 3 is a view of the anvil-rod detached. Fig. 4 shows an inverted plan and end view of the split chuck for locking the anvil-rod. Fig. 4ª shows a modified form of split chuck for the anvil-rod. Fig. 5 shows an end view and a side view of the split bearing-ring. Fig. 6 shows a longitudinal section and an outer end view of the anvil-locking nut. Fig. 7 is a view of the measuring-screw. Fig. 8 is a view of a split chuck or bushing forming part of the mechanism for locking the measuring-screw in adjusted position. Fig. 8ª is a vertical transverse section of a portion of the frame, showing a small screw that holds in said frame the split chuck or bushing for the measuring-screw. Fig. 9 is a perspective of a knurled locking-nut for imparting a longitudinal movement to the split bushing in locking and unlocking the measuring-screw. Fig. 10 shows in detached view two internally and externally threaded nuts that may be employed to compensate for wear of the micrometer mechanism. Fig. 11 is a part-sectional elevation of the micrometer end of the instrument modified for employment of a graduated shell that has its outer end reduced in diameter and internally threaded as a substitute for the outermost one of the before-named compensating nuts. Fig. 12 shows the micrometer end of the instrument in side elevation, illustrating the graduated shell and the micrometer-sleeve; and Fig. 13 is a view similar to Fig. 1, showing in section that end of the frame containing the anvil-rod and devices for clamping the same in any adjusted position.

Referring to the drawings, the numeral 1 designates the frame of the instrument. For the purpose of affording a lengthened support for the anvil-rod 2, Figs. 1 and 3, one end of the frame 1 is provided with a tubular bearing 3, formed with a cylindrical bore and extended beyond the outer portion of said frame. This tubular bearing 3 is constructed with a longitudinal open-ended slot 4, having intermediate its ends a slightly-diagonal notch 5, Fig. 2, formed in one side of the slot. The outer end portion of this slotted and notched tubular bearing 3 is provided with external screw-threads 6, as shown. Into the outer end portion of the tubular bearing 3 there is inserted an elastic expansible and contractible chuck 7, the inner end of which is provided with longitudinal slits 7ª, as shown in Figs. 4 and 4ª. The chuck 7 is cylindrical and constructed with a longitudinal slot 8, having a notch 9 in one side and corresponding in position with the slot 4 and notch 5 of the tubular bearing 3, the slot in the chuck being, however, slightly wider than the slot of the said tubular bearing, into which the chuck is inserted in such manner that the said slots 4 and 8 and notches 5 and 9 will coincide. The outer end of the split chuck 7 may be formed with an angular flange 10, as shown in Fig. 4, or, as shown in Fig. 4ª, it may have a taper 10ª on its outer end. The inner end of the split chuck 7 is provided on the exterior with a taper 10ᵇ, Figs. 4 and 4ª, to correspond with an internal taper shoulder 10ᶜ, formed on the interior of the split tubular bearing 3, as shown in Fig. 2. A split bearing-ring 11 is inserted into the inner end portion of the tubular split bearing 3 in such manner that the split 11ª, Fig. 5, in said ring will aline with the coinciding longitudinal slots of the tubular bearing and inserted chuck. This split ring 11 may be constructed with an annular flange 12, that will constitute a bearing for any one of a series of stops 13, that may be provided on the anvil-rod 2, Figs. 1 and 3, at suitable intervals. The inner end of this rod 2 is formed with an anvil 14, as usual. It will be observed that the coinciding slots 4 and 8 are so arranged as to afford ready passage for the stops 13 in effecting any required longitudinal adjustment of the anvil-rod. The anvil-rod 2 is clamped or locked in its adjusted position by means of the split chuck 7, which is moved inward by a knurled nut 15, screwed onto the screw-threads 6 of the tubular split bearing 3 in such manner that when said nut is turned in the proper direction its outer end portion will bear against the flange 10 or taper 10ª of the split chuck 7, thereby moving said chuck inward, so that the taper 10ᵇ of its inner end will engage the taper shoulder 10ᶜ of the bearing 3, and thus the split chuck 7 will be made to firmly grip and lock the anvil-rod at any degree of adjustment required. When the nut 15 is turned in the opposite direction, a quick release of the anvil-rod is effected by reason of the abrupt tapers 10ᵇ and 10ᶜ and the cylindrical construction of the chuck and the bore of the tubular bearing, the chuck being self-expanding to release the anvil-rod. In the outer end of the knurled nut 15 there is a notch 16, Fig. 6, that is to be brought into coincidence or alinement with the slots 4 and 8, so as to permit passage of the anvil-stops 13 in entering or removing the anvil-rod or changing its adjustment. Although the nut 15 and split chuck 7 will be ordinarily sufficient to lock the anvil-rod 2 in adjusted position, an additional safeguard is afforded at certain adjustments by means of the stops 13, for by loosening the nut 15 sufficiently to permit a slight rotation of the anvil-rod the stop 13 nearest the inner end of the anvil-support can be pulled against the flange or bearing 12 at the inner face of the frame, and at the same time another one of said stops 13 will be received in the coinciding notches 5 and 9, which are so located as to permit this slight partial rotation of the anvil-rod in making adjustments to the several stops. In order to take out the anvil-rod or to change its adjustment, the knurled nut 15 should be first loosened or partly unscrewed by turning it until a mark or zero-line on said nut coincides with a similar mark on the split bearing 3, thus bringing the notch or recess 16 of said nut into line with the slots 4 and 8, so that now by turning the anvil-rod 2 slightly on its axis it can be pulled outward or pushed inward, as may be required, after which the nut 15 may be again screwed up to coact with the split chuck 7 for locking the anvil in place, so that it will be securely held in the precise adjusted position required.

The micrometer end of the frame 1 is constructed with a transverse vertical slot 17 to receive a knurled nut 18, Fig. 9, engaging the screw-threaded periphery of a split chuck or bushing 19, Figs. 1 and 8, that is inserted into the frame 1 at the inner end of a barrel 20, which is formed on or attached to said frame. The chuck or bushing 19 is provided with longitudinal slits 19ª, extended to its inner end, which is formed with a taper 19ᵇ, corresponding with a taper 19ᶜ in the frame. Obviously by rotating the nut 18 in proper direction the chuck or bushing 19 will be drawn inward or outward to or from the taper bearing 19ᶜ to thereby lock or release the micrometer-screw 23, as required. It will be seen that the taper 19ᶜ is in the interior of the slotted end of the frame 1 and that the elastic split bushing 19 is wholly housed within such slotted end of the frame. By this specific construction and arrangement the tapers 19ᵇ 19ᶜ and the entire bushing 19 are entirely internal, concealed, and protected, so that dirt and grit are effectually excluded therefrom, thus maintaining these parts in accurate smooth working condition. Into the outer end portion of the barrel 20 there may be screwed two externally and internally threaded nuts 21 and 22, Figs. 1 and 10, for engaging the micrometer-screw 23, Figs. 1 and 7, which is also passed through the barrel 20 and through the split bushing 19, as shown in Fig. 1. On the outer portion of the micrometer-screw 23 there is an annular shoulder 24 to provide a bearing for the inner side of the closed or cap end of the micrometer-sleeve 25, as shown. The micrometer-sleeve is provided at the outer side of its cap end with a split tubular neck 26, that fits over a tubular end 27 of the measuring-screw 23, adjacent to the shoulder 24 thereon. A knurled collar 28 is pressed onto the split neck 26 of the micrometer-sleeve, and a clamping-screw 29 is then inserted into the tapped tubular end 27 of the measuring-screw 23, thereby securely locking or clamping together the said measuring-screw and micrometer-sleeve in such manner that they can be readily disconnected whenever desired.

The external and internal surfaces of the nuts 21 and 22 should be differentially threaded, so that by withdrawing the micrometer-sleeve and attached measuring-screw these nuts can be adjusted to compensate for wear of the micrometer, and thus readily maintain the capacity of the instrument for accurate measurement. The barrel and the exterior of the nuts 21 and 22 are threaded—for instance, 36 or 38—while the measuring-screw and the interior of the nuts are threaded, say 40. Thus when the screw or nuts, or both, become worn a slight turn of the outermost nut will take up lost motion from the fact that the external and internal threads are of different pitch.

If it is desired to take out the chuck or split bushing 19, the locking-nut 18 will be turned to loosen said chuck or bushing. The micrometer-sleeve and connected measuring-screw will be next screwed out and the nuts 21 and 22 removed, and then by withdrawing a small screw 30, Fig. 8ª, that holds the bushing 19 in place, the latter can be run out of the nut 18 by turning said nut in proper direction, and the bushing can then be readily shaken out from the frame and barrel.

The barrel 20 and micrometer-sleeve 25 may be suitably graduated or marked to indicate required measurements, as usual, and by means of the nut 18 moving the split bushing 19 inward to the taper bearing 19ᶜ the measuring-screw can be readily and securely locked at any required adjustment of the micrometer devices.

I may sometimes employ a shell 31 intermediate the barrel 20 and micrometer-sleeve 25, as shown in Figs. 11 and 12. This shell 31 is slipped over the barrel 20 and is screwed thereon at its inner end, which is received in a recess formed in the frame, thus making a neat finish. In this case, as shown in Fig. 12, the outside of the shell 31 is graduated instead of the barrel. There is a nut 21 placed in the barrel to engage the measuring-screw, and the outer end of the shell 31 is reduced in diameter and internally threaded at 32 to also engage the measuring-screw and take the place of the hereinbefore-mentioned nut 22 in adjusting the instrument to compensate for wear of the micrometer.

To adjust the instrument when the zero-line on the micrometer-sleeve 25 does not coincide with the line on the barrel 20 or shell 31, the clamping-screw 29 should be removed or loosened, so as to unlock the sleeve 25 from the measuring-screw 23, and then after setting the zero-line on the sleeve with the line on the barrel or shell, as the case may be, the sleeve and measuring-screw may be again locked or clamped securely together.

It will be observed that the split bushing 19 and the means for effecting a wear-compensating adjustment for the micrometer mechanism are so inclosed and protected as to exclude access of grit or injurious foreign matters. The graduated shell 31 intermediate the barrel 20 and micrometer-sleeve 25 affords the important advantage that should accidents in graduating happen in the course of manufacture the whole frame would not be spoiled, but only this shell, which could be readily replaced without much loss. Obviously any accident to the shell 31 in the course of manufacture or in placing on said shell the graduation marks or figures will not affect the integrity of the other parts, and a spoiled shell can be easily replaced.

In case the chuck, Fig. 4ª, is employed as a means for locking the anvil-rod in adjusted position said chuck will close at both ends and lock the anvil-rod firmly at both the inner and outer ends of the tubular bearing 3, from the fact that the knurled nut 15 will close the outer tapered end 10ª of the split chuck at the same time that the taper end 10ᵇ will be closed by coming in contact with the taper 10ᶜ in said tubular bearing; but if the chuck shown in Fig. 4 is used only its taper end 10ᵇ will be closed, as it is moved into engagement with the taper 10ᶜ by turning the nut 15 in proper direction.

It will be observed that the diagonal notch 5, Fig. 2, is inclined in such direction that when the anvil-rod 2 is turned to seat one of its pins or stops 13 against the bearing 12 another pin or stop 13 will slide down the inclined side of the diagonal notch 5 and so draw the first-named stop or pin firmly against said bearing, the diagonal notch 5 thus acting as a cam. The notch 9, Figs. 4 and 4ª, is cut large enough to permit ready passage of the pin or stop without touching the sides of said notch.

What I claim as my invention is—

1. A micrometer-caliper, consisting of a frame carrying at one end an adjustable micrometer-screw and having at the other end a tubular bearing open at its opposite ends and provided with external screw-threads and a cylindrical bore having formed near its inner end an annular inwardly-projecting taper shoulder, an elastic cylindrical chuck having an inner slitted and beveled end fitting and bearing against said taper shoulder, a cylindrical anvil-rod passing through said chuck and extending at its end portions from the opposite ends of said tubular bearing, and a nut engaging the screw-threads of the tubular bearing and bearing against the outer end of the chuck, substantially as described.

2. A micrometer-caliper having a tubular bearing provided with an internal taper, a longitudinal slot and external screw-threads, an elastic, longitudinally-slitted chuck located in said bearing and having an outer flanged end, a longitudinal slot coinciding with the slot of the tubular bearing, and a tapered inner end corresponding to the taper in the tubular bearing, an anvil-rod longitudinally adjustable in said chuck and provided with a series of stops, a split bearing located at the inner end of said elastic chuck and against which one of said stops may be made to bear, and a nut engaged with the screw-threads of the tubular bearing and extended over the flanged outer end of the elastic chuck to move the chuck inward, so that the said tapers contract it into clamping engagement with the anvil-rod for holding it in adjusted position, substantially as described.

3. A micrometer-caliper having a tubular bearing provided with external screw-threads and a longitudinal slot with a notch therein, a split chuck located in said bearing and having a notched longitudinal slot coinciding with the slot of the tubular bearing, an anvil-rod longitudinally adjustable in said chuck and provided with a series of stops, a split bearing against which one of said stops may be made to bear while another is received in the coinciding notches of the slots in said chuck and tubular bearing, and a nut engaged with the screw-threads of the tubular bearing and adapted to impart an inward movement to the chuck, substantially as described.

4. A micrometer-caliper having a barrel, a micrometer-sleeve mounted on the barrel and having an elastic, split neck at its outer end, a collar movably arranged on said neck, a micrometer-screw extending through the barrel and elastic, split neck, and a screw engaged with the outer end of the micrometer-screw and bearing against said collar, to contract the elastic, split neck on the outer end of the micrometer-screw, substantially as described.

5. A micrometer-caliper having a barrel, a micrometer-sleeve, a measuring-screw to which said sleeve is detachably secured, a shell adjustable intermediate the barrel and micromometer-sleeve and having a reduced internally-threaded portion to engage the measuring-screw, and means for locking the measuring-screw in adjusted position, substantially as described.

6. A micrometer-caliper, consisting of a frame carrying at one end an adjustable anvil-rod and having the other end slotted and constructed with an internal, concealed taper, a micrometer-screw, an elastic, externally-screw-threaded bushing housed wholly within the slotted end of the frame and having an elastic, split tapered inner end to seat against said internal, concealed taper, and a screw-nut arranged within the slotted end of the frame and engaging the screw-threaded bushing to move it toward the anvil-rod and thereby cause the internal, concealed taper of the frame to clamp the split tapered end of the bushing upon the micrometer-screw, substantially as described.

In testimony whereof I have hereunto set my hand in presence of two subscribing witnesses.

JOHN P. B. WELLS.

Witnesses:
EDGAR V. WILSON,
WILLIAM G. LORD.